(12) United States Patent
Belenkii et al.

(10) Patent No.: US 9,696,161 B2
(45) Date of Patent: *Jul. 4, 2017

(54) CELESTIAL COMPASS KIT

(75) Inventors: Mikhail Belenkii, San Diego, CA (US);
Todd Barrett, San Diego, CA (US);
Timothy Brinkley, San Diego, CA (US)

(73) Assignee: Trex Enterprises Corporation, San Diego, CA (US)

( * ) Notice: Subject to any disclaimer, the term of this patent is extended or adjusted under 35 U.S.C. 154(b) by 715 days.

This patent is subject to a terminal disclaimer.

(21) Appl. No.: 13/373,009

(22) Filed: Nov. 1, 2011

(65) Prior Publication Data

US 2012/0173143 A1    Jul. 5, 2012

Related U.S. Application Data

(63) Continuation-in-part of application No. 12/283,785, filed on Sep. 15, 2008, now abandoned, and a continuation-in-part of application No. 12/319,651, filed on Jan. 8, 2009, and a continuation-in-part of application No. 12/583,776, filed on Aug. 25, 2009, now Pat. No. 8,471,906, and a continuation-in-part of application No. 12/586,813, filed on Sep. 28, 2009, now Pat. No. 8,597,025.

(51) Int. Cl.
*F41G 3/26* (2006.01)
*G01C 21/02* (2006.01)
*G01C 17/34* (2006.01)

(52) U.S. Cl.
CPC ............ *G01C 21/02* (2013.01); *G01C 17/34* (2013.01)

(58) Field of Classification Search
CPC ............................... G01C 21/02; G01C 17/34
USPC ............................................................ 434/19
See application file for complete search history.

(56) References Cited

U.S. PATENT DOCUMENTS

| | | | | |
|---|---|---|---|---|
| 3,169,191 | A * | 2/1965 | Knapp | 250/214.1 |
| 7,798,264 | B2 * | 9/2010 | Hutcheson et al. | 180/65.1 |
| 7,873,490 | B2 * | 1/2011 | MacDonald | 702/127 |
| 2006/0028550 | A1 * | 2/2006 | Palmer et al. | 348/155 |
| 2006/0073439 | A1 * | 4/2006 | Tengblad | 434/12 |
| 2007/0243504 | A1 * | 10/2007 | Bjorkman et al. | 434/22 |

\* cited by examiner

*Primary Examiner* — Phuoc Nguyen
(74) *Attorney, Agent, or Firm* — John R. Ross

(57) ABSTRACT

A celestial compass kit. The kit includes an inclinometer, a camera system with a special telecentric fisheye lens for imaging at least one celestial object and a processor programmed with a celestial catalog providing known positions at specific times of at least one celestial object and algorithms for automatically calculating target direction information based on the inclination of the system as measured by the inclinometer and the known positions of at least one celestial object as provided by the celestial catalog and as imaged by the camera. The telecentric fisheye lens produces an image on the sensor located at or near the focal plane which remains spatially constant within sub-micron accuracies despite thermally produced changes in the focus of the lens.

24 Claims, 8 Drawing Sheets

FIG. 6
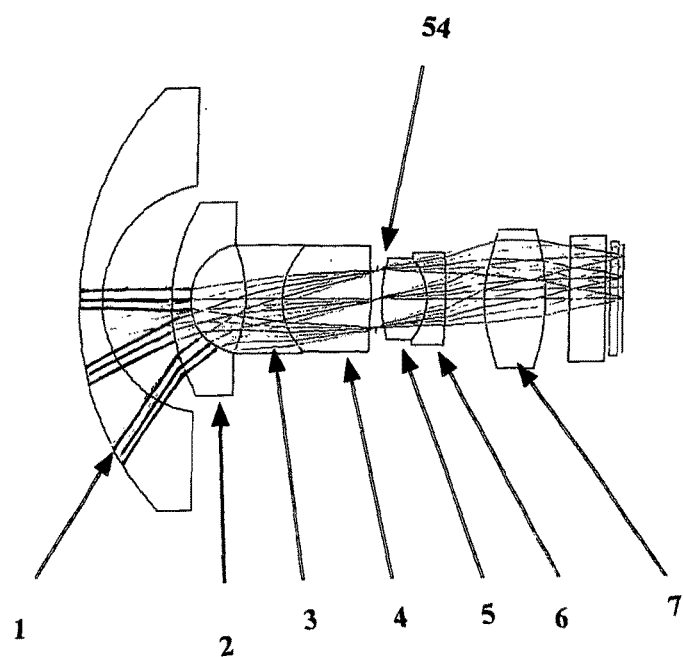
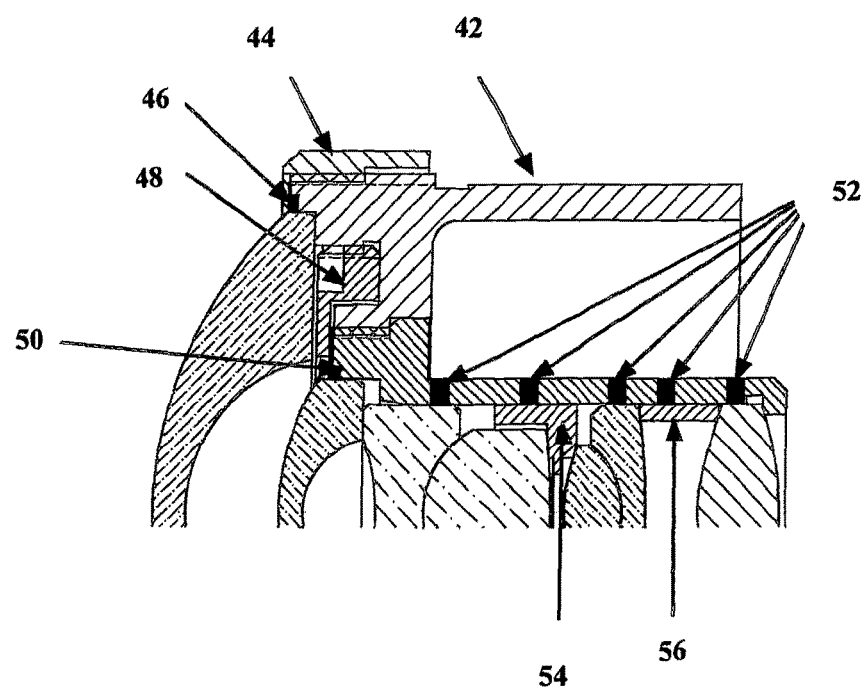
FIG. 7

| # | OD (mm) | RADIUS FRONT (mm) | RADIUS BACK (mm) | MATERIAL | THICKNESS (mm) | SPACING (mm) | NOTES |
|---|---|---|---|---|---|---|---|
| 1 | 18 | 12.09836 | 4.642291 | S-BAL42 | 1.0 | 2.909902 | |
| 2 | 8.5 | 7.65235 | 2.218156 | S-LAH59 | 0.75 | 2.241789 | |
| 3 | 6.5 | -5.795361 | 2.87704 | L-PHL2 | 1.540272 | NA | Elements 3 and 4 are combined into a cemented doublet |
| 4 | 5.0 | 2.872004 | -17.48162 | PBH56 | 3.814777 | 0.25 | see above |
| S1 | 3 | ∞ | ∞ | — | NA | 0.208202 | |
| 5 | 4 | 5.98298 | -2.5 | S-LAL18 | 1.8304131 | NA | Elements 5 and 6 are combined into a cemented doublet |
| 6 | 6.5 | -2.5 | -21.43118 | S-NPH2 | 0.75 | 1.618149 | see above |
| 7 | 6.5 | 5.61460 | -8.73763 | TAF3_MOLD | 2.570635 | NA | Even-Asphere conic constant: 0.942844 $r^2$-0.0 $r^4$ -3.470012743747·$10^{-3}$ $r^6$ -4.254842740564 $10^{-6}$ $r^8$ -6.71405693436 $10^{-6}$ |

FIG. 9

CELESTIAL COMPASS KIT

CROSS REFERENCE TO RELATED APPLICATIONS

This application is a continuation in part of patent application Ser. No. 12/283,785, Portable Celestial Compass filed Sep. 15, 2008, Ser. No. 12/319,651, Angles Only Navigation System filed Jan. 8, 2008 and Ser. No. 12/583,776 Miniature Celestial Direction Detector filed Aug. 25, 2009 and Ser. No. 12/586,813 filed Sep. 28, 2009, each of which are incorporated herein by reference.

FEDERAL SUPPORTED RESEARCH

The present invention was made in the course of work under contract number W15P7T-06-D-E402/0091 and the United States Government had rights in the invention.

FIELD OF INVENTION

The present invention relates to direction detection systems, especially to such systems designed for use in determination of precise locations of targets.

BACKGROUND OF THE INVENTION

Sky Charts

The position of celestial objects at any time at any place on earth is known with extremely high accuracy. These celestial objects include all recognizable stars and planets, the sun and the moon. Celestial objects also include visible man-made satellites. Accurate positioning of the celestial objects depends only on knowledge of the latitude and longitude positions and on the date and the time to within about 1 to 3 seconds of observation. Latitude and longitude generally can be determined easily with precision of less than one meter with global positioning equipment. Computer programs with astronomical algorithms are available that can be used to calculate the positions of any of these celestial objects at any time for any position on or near the surface of the earth. Star pattern recognition computer programs are available in the prior art. These computer programs are described in several good text books including Astronomical Algorithms by Jean Meeus, published by Willmann-Bell with offices in Richmond Va. Techniques for using the programs to determine the positions of the celestial objects are clearly described in this reference. Programs such as these are used to provide planetarium programs such as "The Sky" available from Software Bisque and "Guide" available from Project Pluto.

Fisheye Lenses

Fisheye lenses are lenses with a highly curved protruding front that enables it to cover a solid angle of about 180 degrees. The lenses provide a circular image with barrel distortion.

MEMS Inclinometers

Vertical at the observation position can easily be found by using an inclinometer. Tiny MEMS type inclinometers (such as Analog Devices ADIS162097) with accuracies better than 2 milliradians are available from suppliers such as Jewell Instruments with offices in Manchester, N.H. and Digikey with offices in Thief River Falls Minn. The cost of these inclinometers typically is in the range of about $60.

Digital Magnetic Compasses

Magnetic compasses are typically accurate to only one degree, and the presence of steel or other local disturbances will often reduce accuracy of the magnetic compasses to several degrees or render them useless. Therefore, if positioning of a target depends on the use of a magnetic compass, substantial position errors could likely result. In the case of military operations, the accuracy of current and future fire support systems strongly depends on the errors in target coordinates called target location error. In order to reduce collateral damage and improve target lethality, a target locator error on the order, of less than, 10 meters at 5 km range is needed. Current target location technology does not meet this standard. The main source of error is magnetic compasses. Commonly a ground-based observer determines target coordinates using a laser rangefinder, GPS receiver, and magnetic compass. Under ideal magnetic conditions the measurement error (usually referred to as an "RMS error" of a magnetic compass is typically 10-17 milliradians. This corresponds to the locator error of 50-85 meters at a 5 km range. In many situations knowledge of the true azimuth to a target with precision of much better than 1 degree (about 17.45 milliradians) is needed. Also magnetic compasses are highly sensitive to random errors caused by weakly magnetic disturbances (e.g. vehicles, buildings, power lines etc.) and local variations in the earth's geo-magnetic field. These error sources are random and cannot be accurately calibrated and modeled to subtract out. A large magnetic disturbance from hard or soft iron effects can result in target accuracy errors of up to 30 to 60 degrees.

Attitude Heading and Reference Systems

Attitude heading reference systems (AHRSs) are 3-axis sensors that provide heading, attitude and yaw information for aircraft. AHRSs are designed to replace traditional mechanical gyroscopic flight instruments and provide superior reliability and accuracy. These systems consist of either solid-state or MEMS gyroscopes, accelerometers and magnetometers on all three axes. Some of these systems use GPS receivers to improve long-term stability of the gyroscopes. A Kalman filter is typically used to compute solutions from these multiple sources. AHRSs differ from traditional inertial navigation systems (INSs) by attempting to estimate only attitude (e.g. pitch, roll) states, rather than attitude, position and velocity as is the case with an INS.

AHRSs have proven themselves to be highly reliable and are in common use in commercial and business aircraft. Recent advances in MEMS manufacturing have brought the price of Federal Aviation Administration certified AHRS's down to below $15,000.

Although gyroscopes are used to measure changes in orientation, without the absolute references from accelerometers and magnetometers the system accuracy quickly degrades. As such, when there are extended periods of interferences or errors introduced into the sensing of gravity or magnetic field performance of the system can be seriously compromised. As a general reference, gravity is almost perfect—it is a constant force that is not influenced dramatically by anything. The most difficult error introduced in sensing gravity is the acceleration added during movements. Each time the weapon is moved, acceleration is sensed, thus creating a potential for error. This however is easily mitigated by applying algorithms to the data that filter out such high frequency accelerations, resulting in a very accurate means of determining the vector of gravity. Note that this information is used only for initial setup and system corrections, and is not needed for real-time tracking of orientation. Magnetic field disturbances are much more difficult to deal with.

The Need

What is needed is a better compass for determining the pointing direction.

SUMMARY OF THE INVENTION

The present invention provides a celestial compass kit. The kit includes an inclinometer, a camera system with a special telecentric fisheye lens for imaging at least one celestial object and a processor programmed with a celestial catalog providing known positions at specific times of at least one celestial object and algorithms for automatically calculating target direction information based on the inclination of the system as measured by the inclinometer and the known positions of at least one celestial object as provided by the celestial catalog and as imaged by the camera. The telecentric fisheye lens produces an image on the sensor located at or near the focal plane which remains spatially constant within sub-micron accuracies despite thermally produced changes in the focus of the lens. Preferred embodiments of the kit include a movable filter unit to increase greatly the dynamic range of the kit and permit day and night operation with the single lens. In preferred embodiments the filter unit includes an electromagnetic switch. In other embodiments the switch is a manual switch or a motor-driven switch. The filter in preferred embodiments is comprised of a thin Mylar film coated with a special partially reflective coating. With the increased dynamic range of the camera the moon can be imaged during the period after sunset and before sunrise when stars are not visible. The kit permits imaging of the moon and sun through light cloud cover. Other preferred embodiments can include an inertial navigation sensor including a magnetic compass and a memory-based optical navigation system that permits continued operation on cloudy days and even in certain in-door environments. In preferred embodiments calibration components are provided in a separate module to minimize the size and weight of the compass kit.

These embodiments use celestial sighting of the sun, moon or stars to provide absolute azimuth measurements relative to absolute north. An internal MEMS inclinometer provides elevation measurements relative to the local vertical (gravity based). Celestial observations are combined with known observer position and time, which can normally be obtained from a GPS receiver, in order to compute the absolute azimuth pointing of the device.

The present invention has the following principal advantages over the similar prior art device discussed in the background section:
Nonmagnetic compass
No performance degradation over time (no drift)
Compact
No moving parts (other than the filter)
Lightweight
Low power
Low cost
RMS azimuth measurement error is about 1 mil
Low production cost Allow for operation in urban environments, near vehicles and power lines, and while wearing body armor
Near zero startup time (azimuth measurement in about 2 seconds)

BRIEF DESCRIPTION OF THE DRAWINGS

FIG. 1A is a drawing showing an enlarged view of the FTL system mounted on a tripod.
FIG. 6 is a drawing showing the lens elements of a telecentric fisheye lens specially designed for this preferred embodiment of the present invention.
FIG. 7 is a cross sectional drawing of a portion of the fisheye lens showing detailed features of the lens.
FIG. 9 is a set of specifications for the telecentric fisheye lens system.

DETAILED DESCRIPTION OF PREFERRED EMBODIMENTS

Figure 1:
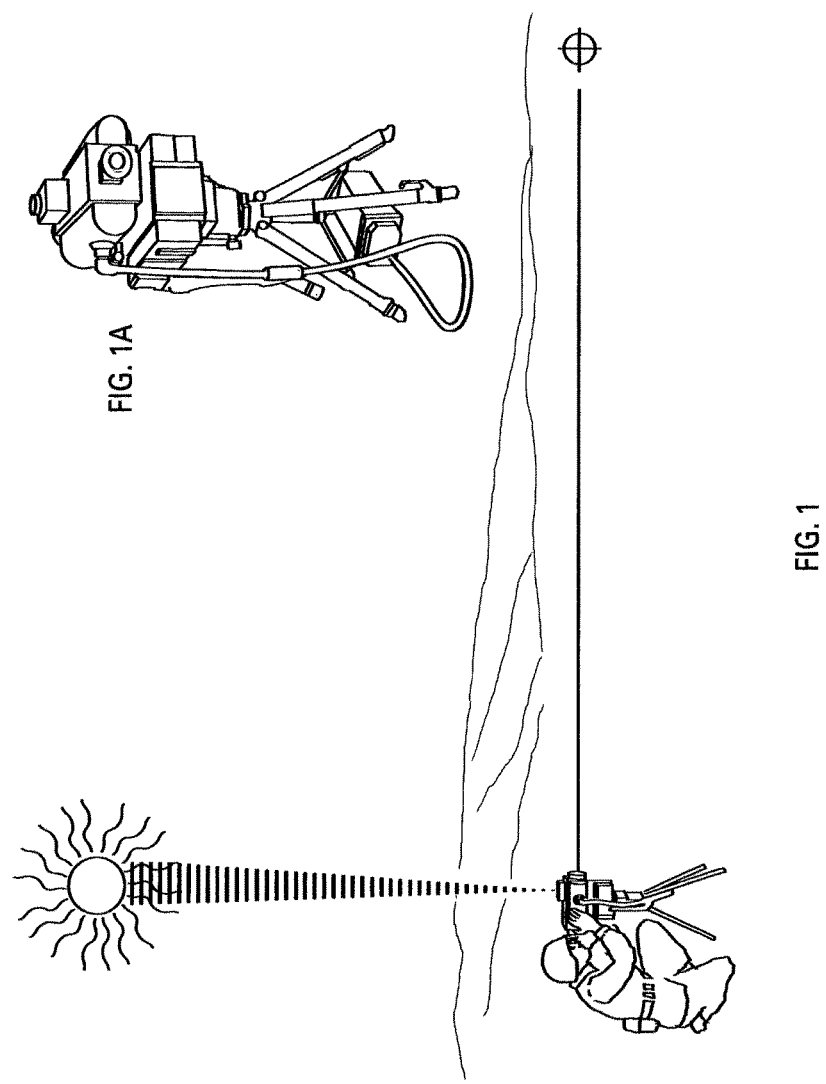
FIG. 1 illustrates a preferred embodiment of the present invention where the celestial compass is an accessory of a far target location (FTL) system.

Preferred embodiments of the present invention can be described by reference to the drawings. A preferred embodiment is shown in FIG. 1 and FIG. 1A where the celestial compass 82 of the present invention is an accessory to a far target location system 84 mounted on a tripod. The celestial compass has imaged the sun 88 and with information from an inclinometer (not shown), the correct date and time and the correct geographic position of the laser finder, the processor within the celestial compass has determined the orientation of a telescope in the far target location system and with the timing of a return infrared laser pulse from target 90 has determined the exact geographic position of the target.

Figure 2:
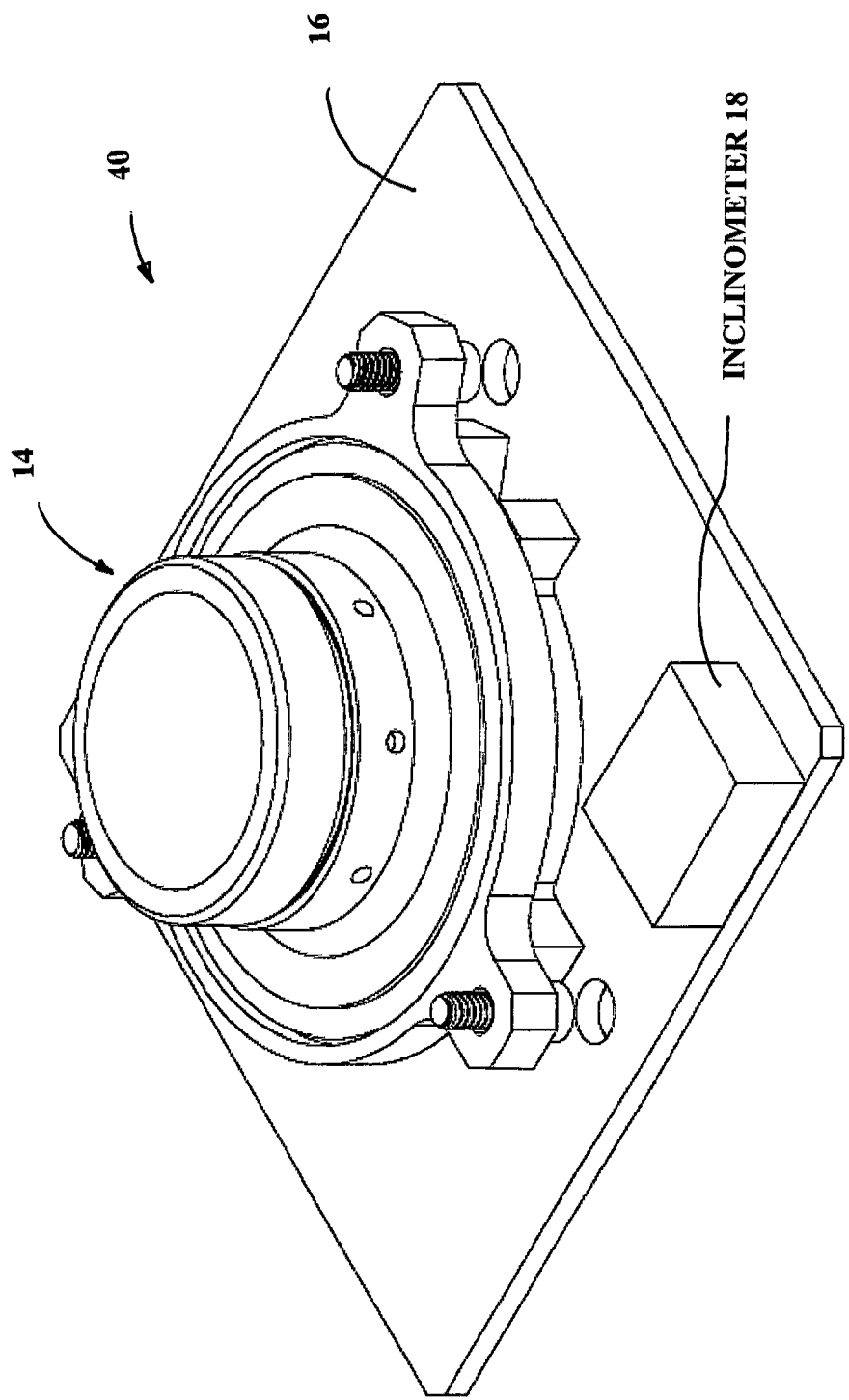
FIG. 2 is a prospective view of a preferred embodiment of the present invention.

A preferred module of the celestial compass 82 of the present invention is shown in detail in FIGS. 2 through 8. FIG. 2 is a prospective view of the celestial compass. Shown in the drawing is celestial compass 82, with a single fisheye lens assembly 14 mounted on circuit board 16. Also shown in this drawing is inclinometer unit 18 which is an off-the-shelf unit, Model ADIS 16209 furnished by Analog Devices with offices in Norwood Mass.

Figure 3:
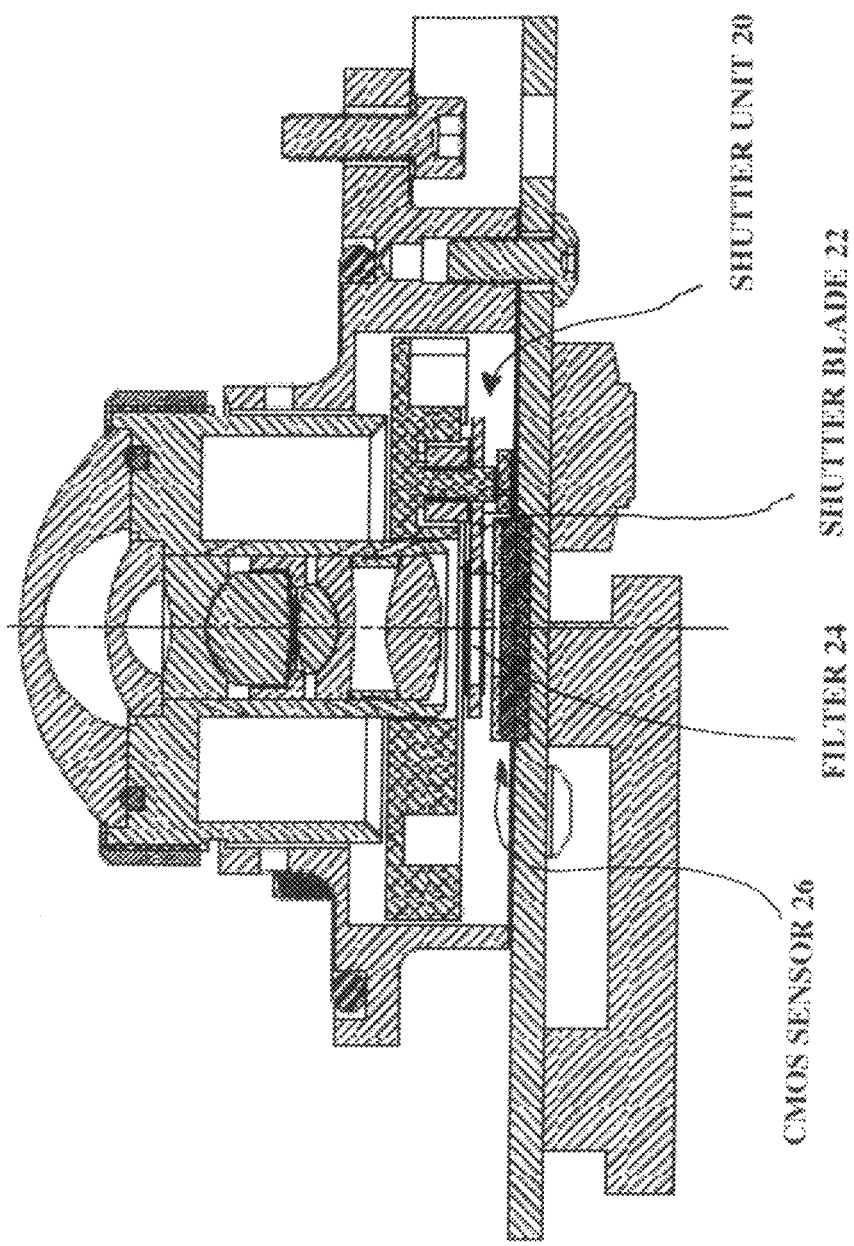
FIG. 3 is a cross sectional drawing showing features of the FIG. 2 embodiment.
Figure 4:
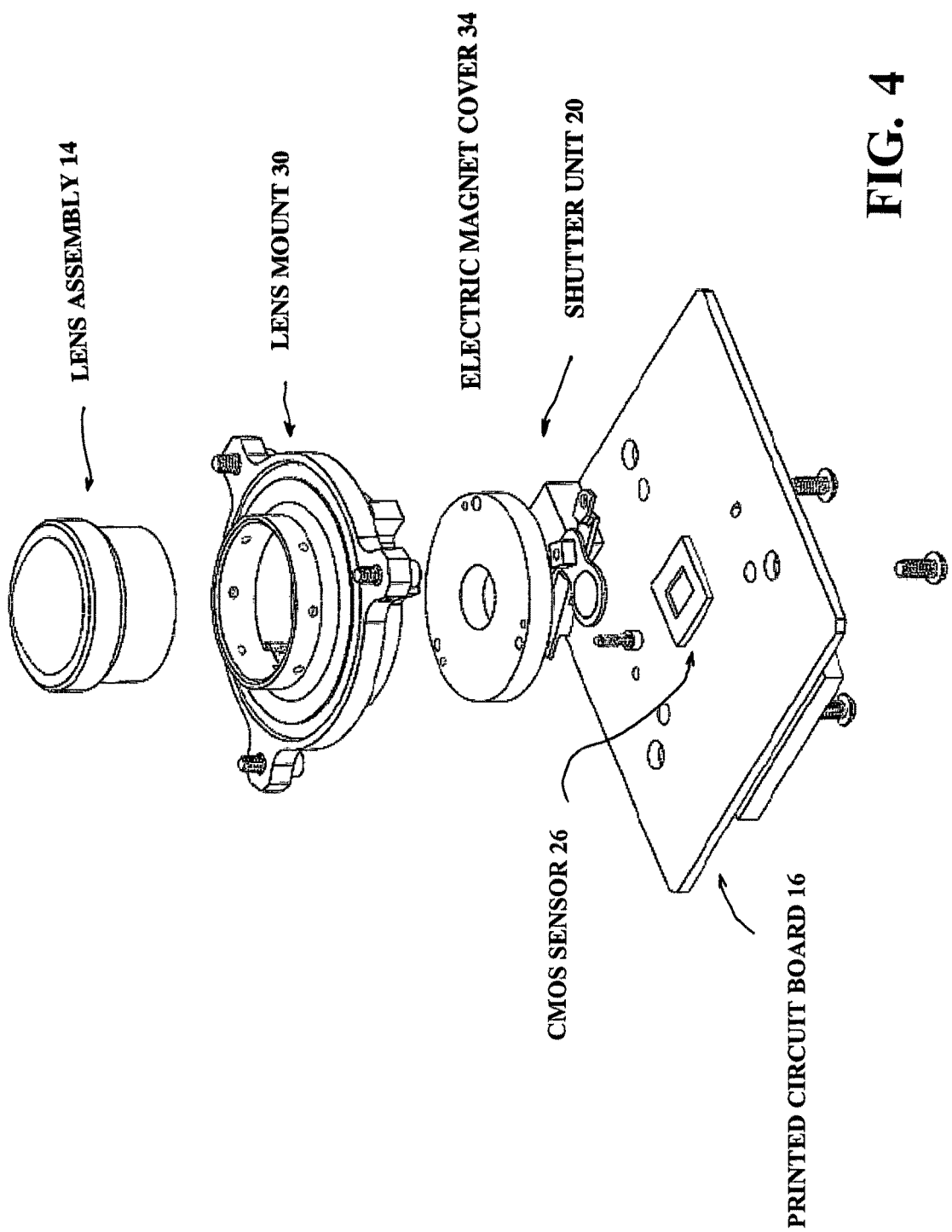
FIG. 4 is an exploded view drawing of the FIG. 2 embodiment.
Figure 5:
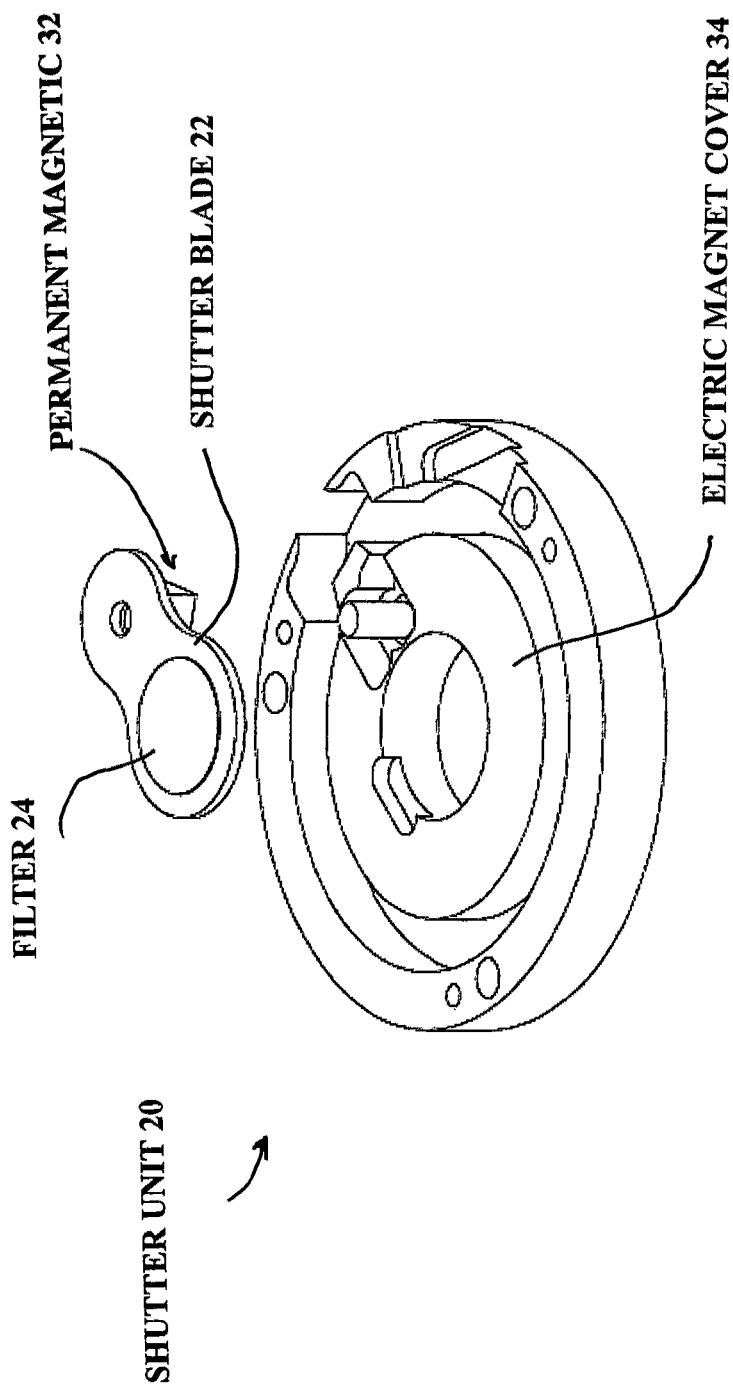
FIG. 5 is a breakaway drawing of the electronic filter mechanism of the preferred embodiment.

FIG. 3 is a cross sectional drawing showing some additional features of this preferred embodiment. This celestial compass utilizes a single lens and a single CMOS sensor for imaging the sun during daytime and for imaging the moon and stars during the nighttime. Since brightness levels during the day are many orders of magnitude greater during the day as compared to night, applicants have designed an automatic shutter-filter system permitting the same lens-sensor unit to be used during the day and at night. The preferred shutter unit is shown at 20 in the FIG. 3 drawing. The shutter blade is shown at 22, the filter is shown at 24 and the CMOS sensor is shown at 26. The CMOS sensor is a 5 mega pixel CMOS sensor Model No. MT9P031 provided by Aptina with offices in San Jose, Calif. FIG. 4, which is an exploded view drawing, shows additional details of the celestial compass including lens assembly 14, lens mount 30, shutter unit 20 and shutter permanent magnetic cover 32. Under the cover (not shown is an electric magnet in the form of a circularly-shaped coil. The CMOS sensor is shown at 26. These components are mounted on circuit board 16.

Shutter-Filter

The shutter-filter is a modified version of an off-the-shelf shutter available from Uniblitz with offices in Osborne, Wash. The shutter was converted to an "in or out" filter. This shutter-filter includes a small permanent magnet shown at 32 in FIG. 5 that is positioned within a break in the circularly-shaped coil of the electro magnet. The direction of current flow through the coil of the electromagnet determines the position of filter blade 24. A reversal of current in the coil changes the orientation of the magnet and the shutter blade by 180 degrees. Current flow in a first direction orients the filter above CMOS sensor 26 for imaging the sun during daytime operation of the celestial compass and current flow in the opposite direction orients the filter away from the sensor for nighttime operation for imaging the moon or stars. The filter blade is held in place by friction if no current is flowing in the coil. So current is required only when changing the filter position. The filter itself is a thin film filter on a polyester (preferably Mylar®) substrate providing $10^6$ blocking.

Telecentric Lens

FIGS. 6 and 7 are drawings of telecentric fisheye lens utilized in the preferred embodiment of the present invention. The lens unit consists of seven optical elements shown as elements 1 through 7 in FIG. 6. The mechanical details of the layout are shown in the cross sectin drawing of FIG. 7. It consists of a single lens tube with a varying diameter. The inner diameter of the tube at each axial position matches the diameter of the lens elements and spacers that it contains. An integral skirt is part of the lens mounting structure and is used to attach the lens to an outer structure. Shown in FIG. 7 are lens mount structure 42 to hold the lens elements, a threaded retained ring 44 for holding lens element 1 and to preload in compression all subsequent lens elements, a threaded retainer ring 48 for holding lens element 2, several holes 52 in lens mount 42 for permitting injection of adhesive to fix lens elements 3-7 and their associated spacers, spacer-optical stop 54 hole 46 for adhesive for fixing lens element 1 and spacer 56 for setting the space between lens elements 6 and 7. Two sets of cemented doublets are constructed using lens elements 3&4 and 5&6 as shown in FIGS. 6 and 7. The specifications for the optical elements are found in the table in FIG. 9. Lens element 1 is held in place with retaining ring 44 which compresses the element against a ledge in the lens mount. In order to insure mechanical stability each element of the lens and each spacer is attached to the lens tube by way of an adhesive. The preferred adhesive is a non-outgassing room temperature volcanizing (RTV) silicone. For elements 1 and 2 the adhesive is applied in a 360° ring around the lens element. For elements 3-7 and the spacers around these elements as pictured in FIG. 7. The lens mount structure 42 has a series of holes 52 in it by which the adhesive may be injected as described above. The process of delivering the adhesive should insure that the adhesive contacts the side of the lens element or spacer that is radially in line with, and fill the entire hole. Four adhesive holes are distributed at 90° increments at each axial hole position. In order to facilitate applying the adhesive into the holes in the lens tube corresponding holes are position radially in the skirt structure. These allow a hollow adhesive dispensing tube to access the inner holes. To insure stability over a wide temperature range the housing structure, retaining rings, and lens spacers are made of titanium.

Electronic Components

Figure 8:
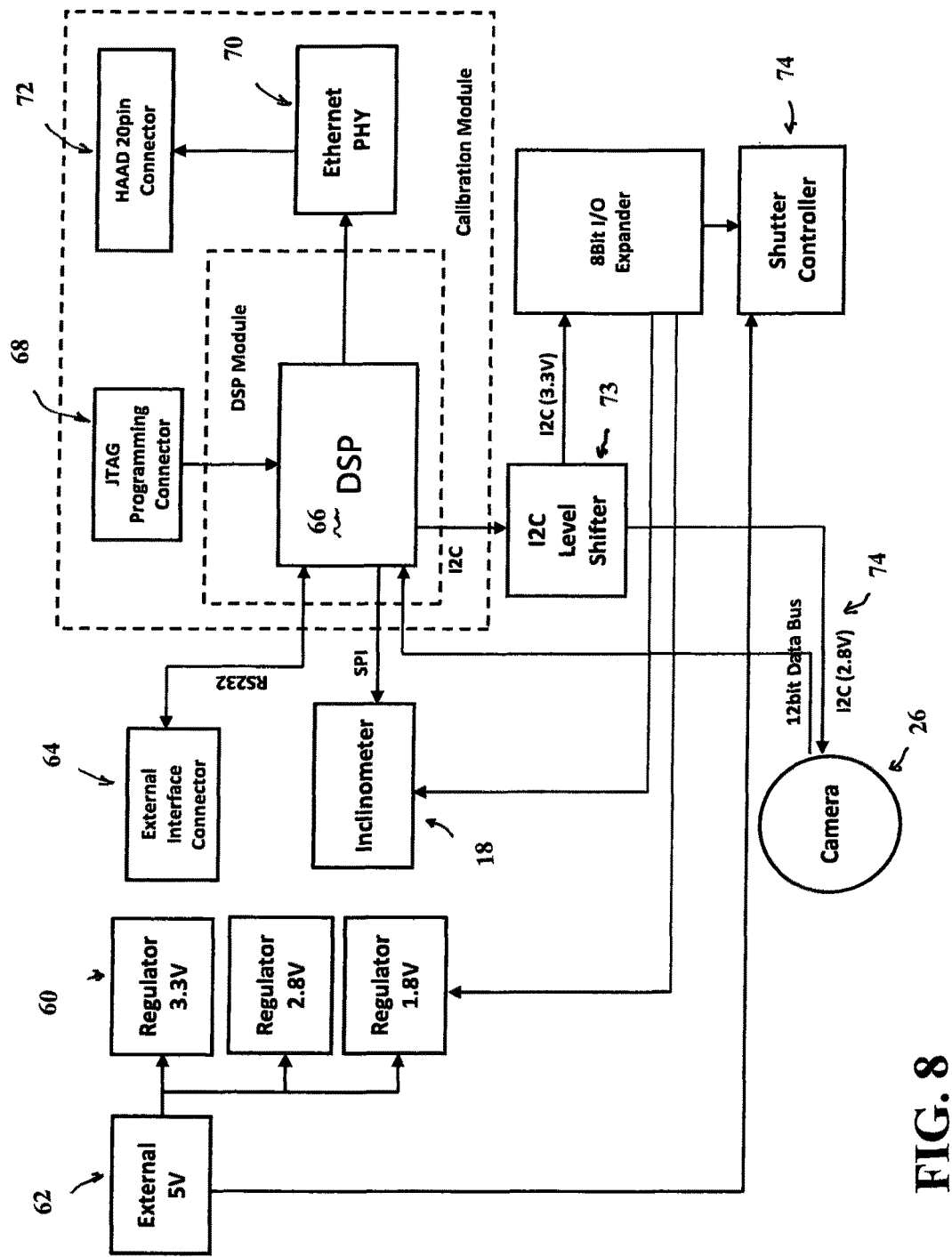
FIG. 8 is a block diagram showing electronic components of the above preferred embodiment of the present invention.

FIG. 8 is a block diagram showing important features of the electronic components of the above preferred embodiment of the present invention. These components include a set of voltage regulators 60 supplied by and external 5 volt source 62 and an external interface connector 64 in communication with digital signal processor 66 which is a DSP module (Model Backfin 537) supplied by Analog Devices with offices in Norwood, Mass. The processor is programmed and de-bugged with JTAG interface 68. The output of DSP 66 is an input to an Ethernet PHY chip 70 (Model KS8721BLI) supplied by Micrel Inc. with offices in San Jose, Calif. and a 20 pin connector 72 which provides for a connection with a simulator an a image display monitor (not shown). The DPS module 66 is also in communication with CMOS sensor 26 via an I2C level shifter 73 and a 12 bit Data Bus as shown in FIG. 8. And the module 66 is also in communication with shutter controller 74 and inclinometer 18 through an 8 Bit I/O expander as shown in the drawing. The inclinometer is a small high accuracy, dual-axis digital inclinometer and accelerometer Model ADIS 16209 supplied by Analog Devices with offices in Norwood, Mass.

Process for Converting Celestial Data into Target Direction

To determine the accurate location of a small celestial target relative to the camera requires only a centroid measurement. To determine the accurate celestial location of the sun or moon requires finding the edges of the target and then calculating the true center based on the size and shape of the target at the time of the observation. The software as indicated above must correct for the distortion of the fisheye lens while also converting image data into astronomical coordinates, preferably elevation, bank and azimuth.

Outline of basic daytime algorithm processing steps:

1) Measure sun azimuth and zenith on the fisheye where radius to center is proportional to the zenith angle and azimuth is the angle between column offset and row offset from the center.
2) Mathematically rotate azimuth and zenith angle (small angle approximation) from sensor/fisheye frame to inclinometer frame (i.e. calibrate by determining fisheye boresight when inclinometer is zeroed).
3) Mathematically rotate azimuth and zenith from inclinometer frame to local horizon frame with unknown azimuth offset.
4) Determine azimuth offset by taking difference between measured azimuth (step 3) and known sun position (from time and position).
5) Mathematically rotate boresight pointing in inclinometer coordinates to local horizon coordinates (with unknown azimuth) using inclinometer measurements
6) Determine absolute azimuth of boresight by azimuth offset determined in step (4).

Calibration procedure: Reverse steps (5) and (6) above while siting targets with known absolute azimuth. The calibration procedure and the procedure for absolute target azimuth and zenith (elevation) angle determination is described below.

A brief description of variable notation is summarized in Table 2. The reader should note that all coordinate rotations are based on small angle approximations. This seems reasonable since all measurements of the optical axis offset from the inclinometer z-axis (zenith pointing for zero readings) show angles less than 10 milliradians. All measurements were based on objects with inclinometer pitch and roll readings less than 5 degrees.

The sun position on the sensor is determined by a center of mass calculation. A matched filter determines the location of the sun (not necessary simply finding the peak is sufficient). The background (+ camera analog to digital bias) is determined as the average of a 32×32 pixel region centered on the peak and excluding the center 16×16 pixels. A center of mass calculation is made including only those pixels in the 16×16 region with signal exceeding 5% of the peak value.

The equations assume that the image distance from the optical axis on the sensor is a linear function of the zenith angle under the following additional assumptions:
1) Inclinometer axes are orthogonal. (Presumably determined by lithography/etch on MEMS since both axes were on a single die).
2) Row/column axes combined with fisheye boresight constitute an orthogonal coordinate system.

TABLE 2

| | Parameter Definitions |
|---|---|
| (1) | $(x_{s0}, y_{s0})$ = array center in pixels on sensor |
| (2) | $\Delta x$ = angular pixel size |
| (3) | $(\alpha_s, \beta_s)$ pitch and roll of fisheye optical axis with respect to inclinometer z-axis (zenith for leveled inclinometer) |
| (4) | $(\phi_b, \theta_b)$ = azimuth and zenith angle of binocular boresight in inclinometer reference frame. |
| | Measured Quantities |
| (1) | $(x_s, y_s)$ = sun centroid on sensor |
| (2) | $(\theta_x, \theta_y)$ = inclinometer measured pitch and roll. |
| | Calculated Quantities |
| (1) | $(\phi_s, \theta_s)$ = measured sun azimuth and zenith angle in sensor/fisheye frame |
| (2) | $(\phi_o, \theta_o)$ = measured sun azimuth and zenith angle in inclinometer frame |
| (3) | $(\phi_l, \theta_l)$ = measured sun azimuth and zenith angle in module based local horizon coordinates |
| (4) | $\Delta\phi_{sun}$ = yaw of module based local horizon coordinates relative to true local horizon coordinates (ENU). |
| (5) | $\phi_l'$ = absolute azimuth of the sun in local horizon coordinates (ENU) calculated based on solar ephemeris, time, and geo-location |
| (6) | $\phi_{bl}'$ = absolute azimuth of the target |
| Detailed equations are set forth below: | |
| | Coordinate system for sun position analysis. |
| (1) | Measure sun centroid $(x_s, y_s)$ |
| (2) | Azimuth and zenith angles in sensor coordinates |
| | $\varphi_s = \tan^{-1}\left(\dfrac{y_s - y_{s0}}{x_s - x_{s0}}\right)$ |
| | $\theta_s = \Delta x \sqrt{(x_s - x_{s0})^2 + (y_s - y_{s0})^2}$ |
| (3) | Rotate to optical axis |
| | $\phi_o = \phi_s + (\beta_s \sin\phi_s + \alpha_s \cos\phi_s) \cot\theta_s$ |
| | $\theta_o = \theta_s + (-\beta_s \cos\phi_s + \alpha_s \sin\phi_s)$ |
| (4) | Rotate to local horizon using inclinometer measurements, $(\theta_x, \theta_y)$ |

TABLE 2-continued

| | Parameter Definitions |
|---|---|
| | $\phi_l = \phi_o - (\theta_y \sin\phi_o - \theta_x \cos\phi_o) \cot\theta_o$ |
| | $\theta_l = \theta_o + (\theta_y \cos\phi_o + \theta_x \sin\phi_o)$ |
| | $\Delta\phi_{sun} = \phi_l' - \phi_l$ |
| | where $\phi_l'$ is the absolute azimuth of the sun. |
| (5) | Rotate boresight to local horizon coordinates |
| | $\phi_{bl} = \phi_b - (\theta_y \sin\phi_b - \theta_x \cos\phi_b) \cot\theta_b$ |
| | $\theta_{bl} = \theta_b + (\theta_y \cos\phi_b + \theta_x \sin\phi_b)$ |
| | $\phi_{bl}' = \phi_{bl} + \Delta\phi_{sun}$ |
| | where $\phi_{bl}'$ is the absolute azimuth of the target, and $\theta_{bl}$ is the absolute zenith angle of the target. |

Calibration Procedures

Several calibration parameters must be determined experimentally. They are listed as the first set of items (1) through (4) in Table 2. Based on small angle approximations the systematic error in measured azimuth resulting from errors in the array center point and off zenith fisheye boresight is given by:

$$\Delta\phi = (\alpha_s \cos\phi_s + \beta_s \sin\phi_s)\frac{\cos\theta_s}{\sin\theta_s} - \frac{\Delta\theta_c}{\theta_s}\sin(\phi_s - \phi_c)$$

where $\Delta\phi$ is the error in the azimuth measurement, $(\phi_c, \Delta\theta_c)$ describes the azimuth and zenith angle on the error in center position, and the remaining parameters are described in Table 2. Notice for a fixed zenith angle, errors in boresight pointing may be corrected by the errors in center location. The expression may be rewritten in terms of an effective center point and divided into sensor row and column, $$\Delta x_c = \beta\theta\frac{\cos\theta}{\sin\theta}$$

$$\Delta y_c = -\alpha\theta\frac{\cos\theta}{\sin\theta}$$

The calibration procedure takes advantage of this property by determining the center location which minimizes the azimuth error (in the least squares since) for a series of measurements at a constant (or near constant for sun) zenith angle. The procedure is repeated for several zenith angles, and the results are plotted as a function of $$\theta\frac{\cos\theta}{\sin\theta}.$$

The slope of a linear least squares fit provides the axis pitch (or roll), and the intercept provides the offset in center column (or row).

Error Analysis

The following is an error analysis. It is based directly on the coordinate transformation equations detailed above, so it cannot be considered an independent check. The results are based on small value approximations. As a first approximation two axis values which add in quadrature phase (a cos x+b sin x) are simply combined in a single "average" term, and systematic errors (such as errors in determining the calibration parameters) are treated in the same manner as random errors (centroid measurement error, mechanical drift, inclinometer noise, etc).

An attempt is made to maintain consistent notation with the explanation of the coordinate transformation. For the simplified case with the inclinometer level, the variance in determining absolute azimuth is approximately:

$$\sigma_{\varphi_{bl}}^2 = \sigma_{\varphi_b}^2 + \sigma_{\varphi_l'}^2 + \left(\left(\frac{1}{\theta_s}\right)^2 + \left(\frac{\bar{a}_s}{\sin^2\theta_s}\right)^2\right)\sigma_{x_s}^2 +$$
$$\left(\frac{\bar{a}_s}{\sin^2\theta_s}\right)^2\left(\left(\frac{\Delta x_e}{\Delta x}\theta_s\right)^2\right) + \sigma_{\bar{a}_s}^2 \cot^2\theta_s + \left(\frac{1}{\sin^2\theta_s}\right)^2 \sigma_{\theta_x}^2$$

A brief summary of the terms is listed in Table 3.

TABLE 3

Summary of error contributions for leveled operation.

(1) $\sigma_{\phi b}$ = error in boresight azimuth calibration (2) $\dfrac{\sigma_{\varphi_l'}}{\alpha_s} =$ error in calculated sun location in ENU frame.

Time, geo-location, and ephemeris errors are all believed to be negligible. Error for (3) $\bar{a}_s$ = average of fisheye boresight angular offset from inclinometer z-axis (4) $\sigma_{x_s}$ = error in sun position on sensor (centroid accuracy based on radiometric SNR, gain variation, and image distortion). SNR contribution believed to be small (image ~3 pixels and camera gain, exposure time set to ~200 counts out of 255, noise measured <1 bit rms). Gain variation not measured. Image distortion, especially for large zenith angles is under investigation.

(5) $\dfrac{\Delta x_e}{\Delta x}$ = fractional error in pixel size (based on linear fisheye response, more generally $\left(\dfrac{\Delta x_e}{\Delta x}\right)\theta_s'$ should be replaced as systematic error in measuring zenith angle).

Response nonlinearity suspected problem. Correction under investigation.

(6) $\sigma_{\alpha_s}$ = error in determining fisheye boresight calibration parameters plus boresight drift (time/temperature). Fisheye boresight calibration long term repeatability under investigation.

(7) $\sigma_{\theta_x}$ = noise in inclinometer measurement.

If the device is permitted to pitch and bank, there is an additional error term which is proportional to the magnitude of the pitch and/or bank of:

$$\frac{\sigma_{\varphi_{blin}}}{\theta_x} \approx \frac{1}{\sin^2\theta_s}\sqrt{\sigma_{x_s}^2\left(\left(\frac{\sin\theta_s\cos\theta_s}{\theta_s}\right)^2 + 1\right) + \sigma_{\bar{a}_s}^2(1+\cos^4\theta_s) + \left(\left(\frac{\Delta x_e}{\Delta x}\right)\theta_s\right)^2}$$

Where a contribution from the boresight zenith angle relative to inclinometer zenith has been omitted (assumed negligible). The reader should note that this corresponds to an rms value instead of the variance shown for leveled operation. All of the error terms are the same as described in Table 3 with the exception of, $\sigma_{\theta x}$, the inclinometer measurement error. For pitched/banked operation, the inclinometer measurement error now includes not only noise, but any gain or nonlinearity contributions.

In addition to the error sources discussed above, the measurements will have two additional error sources. The first is the accuracy of the reference points. The second is pointing the Vector 21 (~1.2 mr reticule diameter). Current rough estimate is that these error sources are on the order of 0.5 mr rms.

Test data proving the accuracy of this embodiment utilized with the Victor 21 binoculars and with a theodolite is reported in parent patent application Ser. No. 12/283,785 which has been incorporated herein by reference.

Once the target is identified, additional software determines the orientation of the camera. Astronomical algorithms and celestial navigation software suitable for programming computer 22 is described and provided in several well-known texts including Astronomical Algorithms by Jean Meeus that is referred to in the Background Section. Once the camera orientation is known, the azimuth of the instrument is easily computed.

Boresighting the Module with Other Instruments

Calibration of the module with other optical instruments requires a single calibration. A target at a known azimuth is imaged by the other optical instruments at the same time that a celestial measurement is made. The azimuth reported by the celestial measurements is then rotated to agree with the other optical instruments.

Calibration Module is Separate

As indicated in FIG. 8 the calibration module (including Ethernet PHY chip 70, 20 pin connector 72 and JTAG connector 68) is a separate module from the DPS Module 66 and circuit board and the optical components in order to minimize the size and weight of the celestial compass.

Advantages and Limitations of the Celestial Compass

A principal advantage of use of the celestial compass as compared to a magnetic compass is that it can continuously measure absolute heading relative to the Earth's true north with accuracy of 1 mil without the use of pre-emplaced infrastructure and does not rely on the use of magnetic compass. However the celestial compass has limitations:

a) It cannot operate in the presence of heavy clouds, fog, and smoke, and
b) Highly dynamic conditions can degrade its performance.

To overcome these limitations Applicants have added an inertial navigation component developed at Innalabs Inc. with offices located in Dullas, Virginia and image-based navigation system for position and weapon attitude determination for indoor conditions developed by Evolution Robotics with offices located in Pasadena, Calif. The use of Innalabs component permits the minimization of the effect of environmental conditions and high angular motion rate on module performance. The use of Evolution Robotics image based navigation system permits determination of position and attitude during indoor exercises.

The memory-based optical navigation system includes a processor programmed with images of the environment where the training is to take place. Images of the environment recorded by a camera mounted on the rifle are analyzed with special algorithms by a computer processor which determines, from the camera images and the programmed images, the pointing direction of the rifle.

Embodiments of the present invention also include software permitting users to identify landmarks imaged by the camera and to determine directions to those landmarks from specific locations during cloudless periods and to use those landmarks and directions as references for determining rifle pointing directions when clouds obscure the sun or stars.

Single Camera Modules

Applicants' earlier versions of their celestial compass included separate optical sensors optimized for daytime and nighttime operation along with two small digital cameras and miniature optical lenses. However, to meet the size, weight, and power requirements for determining pointing direction for rifles, a single-sensor design is preferred. The challenge is that a very large sensor dynamic range of $10^{11}$ to $10^{13}$ must be accommodated in order to measure the position of both the sun and stars.

Exposure time and gain control generally provide for a range of approximately $10^5$ in illumination. To enhance the system's dynamic range, Applicants have developed the filter described above.

The mechanical neutral density filter described above provides the dynamic range required for day/night operation. A motor inserts or removes the filter in about 1 second for day/night operation. The motor is approximately the same size as the fisheye lens. Focus maintained by using a very thin filter, such as 12 micron thick aluminized Mylar film, such that the change in focus is negligible when the filter is inserted.

An alternative filter would be to use a glass filter with an transparent piece of glass adjacent to the filter glass. This second optic would maintain the optical path length, and would appear in the gap as the filter wheel rotates.

Imbedded Micro-Processor

The estimated number of operations required for the daytime sensor to determine target azimuth by imaging the sun is 40 million operations per second. As explained above a preferred micro-processor that meets this requirement is the BlackFin embedded processor ADSP BF537 available from Analog Devices. This processor has many several advantageous features such as very low power consumption (400 mW), a small size in a mini BGA package, a very low cost (approx. $45 in small quantities), and a scalable family of pin- and code-compatible parts. The compatible parts allow the processor to fit the application without requiring major changes to either the hardware or the firmware.

Inertial Navigation Component

The celestial and inertial measurements features of the present invention complement each other well. The celestial measurements are very accurate with essentially no drift over long intervals, but will only be available intermittently due to high sensor motion and environmental conditions. The inertial measurements have very high bandwidth and are accurate over short time periods, but suffer from drift over long time periods. The two are integrated in a typical Kalman filter architecture. All sensors (i.e. the optical sensor, the inclinometer, the inertial navigation component and the magnetic compass if one is used) feed data directly to the main processor. The main processor will implement a Kalman filter to optimally combine the inputs from all four sensors.

The Kalman filter will include estimates for the accelerometer gain and bias drift based on the GPS position updates, gyro gain and bias drift based on the magnetic compass and the celestial sensor, and magnetometer bias drift based on the celestial measurements. Since the celestial measurements constitute the most computationally intensive measurements, they will only be updated once every 10 seconds. In the interim, the celestial sensors will be put in standby mode, and the processor clock will be reduced to conserve power.

Operation

In clear sky conditions day and night, the celestial direction components provides periodic precision azimuth measurements with respect to Earth's true north and provides periodic (every 10 seconds) updates to the Kalman filter. The module provides a key element to the initial alignment at start up. Based on celestial azimuth measurements, the Kalman filter estimates the magnetometer bias drift, as well as gyro gain and bias drift. This allows the module of the present invention to mitigate the errors related to the Earth's declination angle occurring over time. The inertial navigation components correct for rifle movement over short periods. Additionally, the 10-second updates eliminate errors associated with local magnetic disturbances. On the other hand, using inputs from the magnetometer, the effects of highly dynamic conditions on performance is mitigated. The inertial navigation components continuously measure the weapon's motion and provide that information to the processor where it is used to determine the aiming direction of the rifle.

Partly Cloudy Skies

Best results from the celestial direction components are achieved on cloudless days and nights. However these components can function in partly cloudy sky conditions. Test results have demonstrated an RMS target azimuth error, for a clear day or night, of 0.1 mil, for a cloudy day of 0.753 mil, and for cloudy night of 0.75 mil.

When clouds, fog, or smoke interfere with celestial measurements using the celestial direction components, the inertial navigation components which includes continuous input from the magnetometer will serve as a "fly wheel" carrying the celestial fix forward and determining the weapon's orientation. However, even in this case, the input from the magnetometer will include corrections (based on the last available azimuth measurement from the celestial direction components) which permit mitigation of the errors caused by the Earth's declination angle and by large magnetic disturbances.

Power Consumption

Finally, the above describe preferred embodiment has been designed for extremely low power consumption. Various modes of operation are provided: full sleep mode; ready, or stand-by, mode; and operational mode. In the stand-by mode, the microprocessor requires less than 1 mW.

Cloudy Weather

As indicated above in connection with the description of preferred embodiments. The primary components of the present invention cannot function as desired in cloudy weather or in similar situations when the celestial objects are not visible to the system's sensors. For these reasons embodiments may be equipped with a backup digital magnetic compass. This magnetic compass can be calibrated periodically using the features of the present invention and can take over when the heavens are obscured. Alternatively or in addition a miniature attitude and reference system such as the systems discussed in the background section of this specification may be added to allow the target information to be determined in the event that clouds obscure the celestial objects. Also when systems of the present invention is located at a particular location the precise location to a local landmark can be identified by the system and utilized to provide reference directions later in the event of cloudy weather. To utilize this feature an additional camera may be required to assure that an appropriate local landmark is in the field of view of system camera.

Test Results

Actual test results of prototype units confirm that the accuracy of Applicants compasses are about an order of magnitude better than magnetic compasses. As indicated in the Background section magnetic compasses under ideal magnetic conditions operate with a measurement error typically in the range of about 10 to 17 milliradians which results in a locator error of about 50 to 85 meters at a 5 km range. Applicants' celestial compasses (with the sun, moon or visible stars at least 45 degrees off zenith (vertical)) operate with an a measurement error in the range of about 1 to 2 milliradians which corresponds to a locator error of about 5 to 10 meters at the 5 km range.

Applications of the Present Invention

Embodiments of the present invention include in many applications where high accuracy directional equipment is needed such as for use in surveying, on cruise ships, fishing boats and private and commercial aircraft. The invention may also be utilized on robotic vehicles including unmanned aerial vehicles, unmanned marine vehicles and unmanned surface vehicles. A particular important use of the invention will be as a guidance and control feature for robotic vehicles designed for use in dangerous situations where accurate directional information is required. For example, in addition to the telescopic equipment the celestial camera and the MEMS mirror of the present invention, the robotic surveillance vehicle could be equipped with a GPS unit, and a backup digital magnetic compass and a camera for monitoring the field of view of the telescopic equipment. Communication equipment would be needed for remote control of the robotic vehicle. Utilizing features described in the embodiments described above dangerous targets could be identified and neutralized. Embodiments could include weapons for defense or even offence which could be operated remotely.

There are many variations to the above specific embodiments of the present invention. Many of these will be obvious to those skilled in the art. For example in many embodiments focal plane arrays with only about 350,000 pixels will be adequate. Preferably time should be accurate to at least three seconds. For a less expensive system, the inertial navigation system and the memory-based navigation could be omitted. In this case the system would in general not be operative in cloudy weather. However, local landmarks that are visible to the camera could be substituted for celestial objects if the system is properly calibrated using celestial information to determine the position of the landmarks. Operators could also install a substitute landmark to use in this situation. These landmarks could also be used in the full system with the inertial navigation for re-calibration in the event of cloudy weather. So the scope of the present invention should be determined by the appended claims and their legal equivalence.

What is claimed is:

1. A celestial compass kit for use as an assessor to a laser range finder in determining the geographic position of a far target comprising:
  A) a single camera system, adapted for viewing at least portions of the sky and imaging positions of each of the sun, the moon and stars, and comprising:
    1) a telecentric fisheye lens,
    2) a sensor having a focal plane array of at least 350,000 pixels, and
    3) a movable filter unit comprising an optical filter wherein the filter unit is adapted to block portions of sunlight to permit day time viewing of the sun, and to permit night time unblocked viewing of the moon and stars, with the single camera system;
  B) an inclinometer
  C) a processor programmed with a celestial catalog providing known positions at specific times of at least one celestial object and algorithms for automatically calculating target direction information based on the inclination of the system as measured by the inclinometer and the known positions of the range finder and at least two celestial objects as provided by the celestial catalog and as imaged by the camera in order to determine the geographic position of the far target.

2. The celestial compass kit as in claim 1 wherein the at least one celestial object is the sun and the moon.

3. The celestial compass kit as in claim 1 wherein the at least one celestial object is the sun, the moon and a plurality of stars.

4. The celestial compass kit as in claim 1 wherein the at least one celestial object is the sun, the moon a plurality of stars and at least one artificial satellite.

5. The celestial compass kit as in claim 1 wherein the filter unit includes an electromagnetic switch.

6. The celestial compass kit as in claim 1 wherein the filter unit is manually operated.

7. The celestial compass kit as in claim 1 wherein the filter unit includes an electric motor.

8. The celestial compass kit as in claim 7 wherein the electromagnetic switch is adapted to insert the filter between the lens and the sensor with current flowing in a first direction and to remove the filter with current flowing in a second direction opposite direction.

9. The celestial compass kit as in claim 1 wherein the optical filter is a thin film filter.

10. The celestial compass kit as in claim 9 wherein the optical filter is a thin film filter on a polyester substrate.

11. The celestial compass kit as in claim 1 wherein the optical filter is adapted to provide about $10^6$ blocking of the light.

12. The celestial compass kit as in claim 1 wherein the telecentric lens is comprised of at least seven optical elements.

13. The celestial compass kit as in claim 12 wherein the at least seven optical elements is seven optical elements complying with the specifications of FIG. 9.

14. The celestial compass kit as in claim 1 wherein the processor is a digital signal processor and further comprising other electronic components including:
  A) a set of voltage regulators,
  B) a JTAG interface,
  C) an Ethernet PHY chip and
  D) a multi-pin connector.

15. The celestial compass kit as in claim 1 wherein the kit also includes operation components and calibration components and the calibration components can the operations components are housed in a separate module to minimize size and weight of the operations components.

16. The celestial compass kit as in claim 1 wherein the kit is adapted to provide an RMS azimuth measurement error of less than 1 milliradians at night.

17. The celestial compass kit as in claim 1 wherein the kit is adapted to provide an RMS azimuth measurement error of less than 2 milliradians during daytime.

18. The celestial compass kit as in claim 1 wherein the kit is adapted to provide position information relating to the location of the kit based on the position of at least one celestial object and accurate calendar time.

19. The celestial compass kit as in claim 1 wherein the kit is adapted to provide target direction information based on the position of at least one celestial object and accurate calendar time and a known position of the kit.

20. The celestial compass kit as in claim 1 wherein the kit is a component of a surveying instrument.

21. The celestial compass kit as in claim 1 wherein the kit is a component of a gun.

22. The celestial compass kit as in claim 1 wherein the kit includes a backup magnetic compass.

23. The celestial compass kit as in claim 1 and further comprising an altitude heading and reference system (AHRS).

24. The celestial compass kit as in claim 23 wherein the AHRS comprises a Kalman filter.

* * * * *